United States Patent
Serlet et al.

(10) Patent No.: US 9,052,824 B2
(45) Date of Patent: Jun. 9, 2015

(54) CONTENT ADDRESSABLE STORES BASED ON SIBLING GROUPS

(71) Applicant: upthere, inc., Palo Alto, CA (US)

(72) Inventors: Bertrand Serlet, Palo Alto, CA (US);
Roger Bodamer, San Carlos, CA (US);
Emanuele Altieri, Palo Alto, CA (US)

(73) Assignee: upthere, inc., Palo Alto, CA (US)

( * ) Notice: Subject to any disclaimer, the term of this patent is extended or adjusted under 35 U.S.C. 154(b) by 284 days.

(21) Appl. No.: 13/622,026

(22) Filed: Sep. 18, 2012

(65) Prior Publication Data

US 2013/0198475 A1    Aug. 1, 2013

Related U.S. Application Data (63) Continuation-in-part of application No. 13/358,742, filed on Jan. 26, 2012, now Pat. No. 8,631,209.

(51) Int. Cl.
| | | |
|---|---|---|
| G06F 12/00 | (2006.01) |
| G06F 13/00 | (2006.01) |
| G06F 13/28 | (2006.01) |
| G06F 3/06 | (2006.01) |
| G06F 12/02 | (2006.01) |
| G06F 17/30 | (2006.01) |

(52) U.S. Cl.
CPC .............. *G06F 3/0607* (2013.01); *G06F 12/02* (2013.01); *G06F 17/30067* (2013.01); *G06F 3/0631* (2013.01); *G06F 3/0683* (2013.01)

(58) Field of Classification Search
CPC ............................ G06F 12/02; G06F 17/30067
USPC ........................................ 711/108, 148, 173
See application file for complete search history.

(56) References Cited

U.S. PATENT DOCUMENTS

| | | | |
|---|---|---|---|
| 6,807,632 B1 | 10/2004 | Carpentier et al. |
| 7,535,485 B2 | 5/2009 | Elbaz et al. |
| 7,836,267 B1 | 11/2010 | Cross |
| 8,156,429 B2 | 4/2012 | Lotenberg |
| 8,223,191 B2 | 7/2012 | Elbaz et al. |
| 8,713,056 B1 | 4/2014 | Wongkar et al. |
| 2003/0191783 A1 | 10/2003 | Wolczko et al. |
| 2003/0200392 A1 | 10/2003 | Wright et al. |
| 2006/0294165 A1 | 12/2006 | Bacon et al. |
| 2007/0022149 A1 | 1/2007 | Bacon et al. |
| 2008/0086564 A1 | 4/2008 | Putman et al. |
| 2008/0168103 A1 | 7/2008 | Rakic |

(Continued)

OTHER PUBLICATIONS

Ghemawat, Sanjay, The Google File System, Oct. 2003, ACM.*

(Continued)

*Primary Examiner* — Ryan Bertram
(74) *Attorney, Agent, or Firm* — Hickman Palermo Becker Bingham LLP; Ellen Y. Wei (57) ABSTRACT

A content addressable storage (CAS) system is provided in which each storage unit is assigned to one of a plurality of sibling groups. Each sibling group is assigned the entire hash space. Within each sibling group, the hash space is partitioned into hash segments which are assigned to the individual storage units that belong to the sibling group. Chunk retrieval requests are submitted to all sibling groups. Chunk storage requests are submitted to a single sibling group. The sibling group to which a storage request is submitted depends on whether any sibling group already stores the chunk, and which sibling groups are considered full.

22 Claims, 3 Drawing Sheets

(56) References Cited

U.S. PATENT DOCUMENTS

| | | | |
|---|---|---|---|
| 2009/0228511 A1 | 9/2009 | Atkin et al. | |
| 2009/0327372 A1 | 12/2009 | Tlonen | |
| 2010/0058054 A1 | 3/2010 | Irvine | |
| 2010/0064354 A1 | 3/2010 | Irvine | |
| 2010/0070698 A1* | 3/2010 | Ungureanu et al. | 711/108 |
| 2010/0114997 A1 | 5/2010 | Mlcic et al. | |
| 2011/0010578 A1 | 1/2011 | Agúndez Dominguez et al. | |
| 2011/0264871 A1* | 10/2011 | Koifman et al. | 711/154 |
| 2011/0307447 A1 | 12/2011 | Sabaa et al. | |
| 2012/0124105 A1 | 5/2012 | Provenzano | |
| 2012/0159098 A1 | 6/2012 | Cheung et al. | |
| 2012/0210120 A1 | 8/2012 | Irvine | |
| 2012/0215980 A1 | 8/2012 | Auchmoody et al. | |
| 2012/0221524 A1 | 8/2012 | Auchmoody et al. | |
| 2012/0300676 A1* | 11/2012 | Welin et al. | 370/258 |
| 2012/0311339 A1 | 12/2012 | Irvine | |
| 2013/0061049 A1 | 3/2013 | Irvine | |
| 2013/0198462 A1* | 8/2013 | Serlet et al. | 711/142 |
| 2014/0188816 A1 | 7/2014 | Serlet | |
| 2014/0189270 A1 | 7/2014 | Iwanicki et al. | |
| 2015/0026454 A1 | 1/2015 | Boeuf et al. | |

OTHER PUBLICATIONS

"Content-Addressable Storage Wikipedia, the free encyclopedia" downloaded from the Internet: http://web.archive.org/web/20121113190903/http://en.wikipedia.org/wiki/Content-addressable_storage 2012 (4 pages).

Strzelczak, P. et al., "Concurrent Deletion in a Distributed Content-Addressable Storage System with Global Deduplication" downloaded from the Internet https://www.usenix.org/system/files/conference/fast13/fast13-final91.pdf *2013 USENIX Association* (pp. 161-174).

Ungureanu, C. et al., "HydraFS: a High-Throughput File System for the HYDRAstor Content-Addressable Storage System" downloaded from the Internet http://static.usenix.org/event/fast10/tech/full_papers/ungureanu.pdf *Feb. 2012 NEC Laboratories America* (14 pages).

Rhea, S. et al., "Fast, Inexpensive Content-Addressed Storage in Foundation" downloaded from the Internet http://zoo.cs.yale.edu/classes/cs426/2012/bib/rhea08fast.pdf *Proceedings of the 2008 USENX Annual Technical Conference* (14 pages).

Suzaki, K. et al., "Analysis of Disk Access Patterns on File Systems for Content Addressable Storage" downloaded from the Internet https://www.kernel.org/doc/ols/2011/ols2011-suzaki.pdf *2011 Linux Symposium* (13 pages).

"Distributed Hash Table—Wikipedia, the free encyclopedia" downloaded from the Internet: http://web.archive.org/web/20120103125147/http:/en.wikipedia.org/wiki/Distributed hash . . . Dec. 2011 (5 pages).

"Designing Rhino DHT—A fault tolerant, dynamically distributed, hash table—Ayende@. . . " http:/web.archive.org/web/20120122041007/http:/ayende.com/blog/3934/designing-rhino- . . . 2009 (9 pages).

Zhao, J. et al., "Achieving Reliability Through Reputation in a Wide-Area Network PHT Storage System" 2007 (8 pages).

Taneja Group Technology Analysts, "Archiving Beyond File Systems: Object Storage EMC Centera and Disk Archival", dated Jan. 2009, 8 pages.

Robertz et al., "Time-Triggered Garbage Collection", Robust and Adaptive Real-Time GC Scheduling for Embedded Systems, ACM, dated 2003, 10 pages.

Rayner et al., "A Simple Spreadsheet-Based, Miame-Supportive Format for Microarray Data", dated Jul. 2006, 26 pages.

Mellor, Chris, "Making a Hash of File Content", Content-Addressable Storage Uses Hash Algorithms, dated Dec. 2010, 4 pages.

IEEE, "The Authoritative Dictionary of IEEE Standards Terms", Seventh Edition, dated 2000, 3 pages.

Hughes, John, "A Distributed Garbage Collection Algorithm", Sweden, dated 1985, 19 pages.

Frampton et al., "Generational Real-Time Garbage Collection", A Three-Part Invention for Young Objects, Springer, dated 2007, 25 pages.

Dorf, Richard, "The Technology Management Handbook", CRC Press, dated 1999, 3 pages.

Assureon NX, "Easy Archive Appliance", (No publication date available), 2 pages.

* cited by examiner

CONTENT ADDRESSABLE STORES BASED ON SIBLING GROUPS

CROSS-REFERENCE TO RELATED APPLICATIONS; BENEFIT CLAIM

This application claims the benefit as a Continuation-in-part of application Ser. No. 13/358,742, filed Jan. 26, 2012, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to storage systems and, more specifically, to techniques for storing chunks in a manner that does not incur extensive overhead and movement of data when the storage capacity of the system is increased.

BACKGROUND

Information that is used to access a stored digital item is referred to herein as the "access key" of the stored item. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved. In addition, each copy of an item has a different access key, because each copy is stored at a different location.

In contrast to conventional file systems, Content Addressable Storage (CAS) systems allow applications to retrieve items from storage based on a hash value that is generated from the content of the items. Because CAS systems perform storage-related operations on items based on the hash values generated for the items, and the hash values are based on the content of the items rather than where the items are stored, the applications that request the operations may do so without knowing the number or location of the stored copies of the items. For example, a CAS system may store multiple copies of an item X at locations A, B and C. An application that desires to retrieve item X would do so by sending to the CAS system a hash value that is based on the contents of item X. Based on that hash value, the CAS system would provide to the application a copy of item X retrieved from one of the locations A, B, and C. Thus, the application would obtain item X without knowing where item X was actually stored, how many copies of item X existed, or the specific location from which the retrieved copy was actually obtained.

Storing a digital item, such as a file or a message, often involves making a call to a "chunk storage system". A chunk storage system is a storage system that performs storage operations without understanding the format or content of the digital information itself. Such storage systems are referred to as chuck storage systems because the systems treat all forms of digital items as if those items were merely opaque chunks of data. For example, the same chunk storage system may be used by word processing applications, image management applications, and calendaring systems to respectively store documents, images and appointments. However, from the perspective of the chunk storage system, only one type of item is being stored: opaque chunks of digital information.

Chunk storage systems may be implemented as CAS systems. For example, a chunk storage system may generate a hash value for a chunk by applying a cryptographic hash function (e.g. MD5, SHA-1 or SHA2) to the chunk. The chunk store may then store the chunk, and maintain an index that associates the hash value with the location at which the chunk is stored. When an application subsequently requests retrieval of the chunk, the application provides the hash value to the chunk storage system. The chunk storage system uses the index to locate the chunk associated with the hash value, and provides the chunk thus located to the requesting application.

Chunk storage systems may be configured in a variety of ways. U.S. application Ser. No. 13/358,742 describes how larger composite chunk stores may be composed using various types of building block chunk stores. The intended use of a chunk store is one factor in determining what types of building block chunk stores to use, and how those chunk stores should be arranged.

A chunk storage system that is configured to store different chunks at different building block chunk stores is a form of distributed hash table, where the hash value produced by applying the hash function to the chunk determines which building block chunk store will ultimately store the chunk. For example, consider a simple scenario that includes two chunk stores CS1 and CS2. Assuming that the hash function produces hash values between 0 and 1,000,000, chunks that hash to a value that falls between 0 and 500,000 may be stored at CS1, while chunks that hash to a value that falls between 500,001 and 1,000,000 may be stored at CS2.

The full range of values to which chunks may hash (e.g. 0 to 1,000,000) is referred to as the "hash space". A portion of the hash space is referred to as the "hash segment". In a system with multiple building block chunk stores, different hash segments may be assigned to different building block chunk stores. In the example given above, CS1 is assigned the hash segment of 0 to 500,000, and CS2 is assigned the hash segment of 500,001 to 1,000,000.

Because different chunk stores are assigned different hash segments, a chunk store system must be able to determine, based on the hash value generated by a chunk, which chunk store needs to be involved in an operation on that chunk. While maintaining a hash-segment-to-chunk-store mapping is relatively straightforward in a steady state, it becomes increasingly difficult to maintain when new chunk stores are added to the system and/or existing chunk stores fail. In either case, it may be necessary to revise the hash-segment-to-chunk-store mapping. To maintain consistency, any such change in the mapping may also require chunks to be redistributed among the chunk stores. Such redistribution operation may be expensive both with respect to time and computer resources.

Thus, in a traditional Distributed Hash Table ("DHT") that stores chunks and retrieves chunks using CAS, it is difficult to dynamically add storage to the DHT to offer more overall storage, while minimizing down time, optimizing response time, and maximizing storage utilization rate. Traditionally, adding storage in such an environment is done by associating the storage media, typically disks, to hash ranges, and dynamically rearranging the hash ranges when new disks comes online. Various techniques have been proposed and used to split the hash ranges when they reach a certain threshold, and move chunks from one disk to another to equalize disk utilization. However, such techniques inevitably incur downtime while chunks are redistributed and mappings are updated.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for reducing the overhead and performance degradation produced by adding new storage to a CAS system. According to one embodiment, each storage unit in the CAS system is assigned to one of a plurality of "sibling groups". Each sibling group is assigned the entire hash space. Within each sibling group, the hash space is partitioned into hash segments which are assigned to the individual storage units that belong to the sibling group.

Chunk retrieval requests are submitted to all sibling groups. Chunk storage requests are submitted to a single sibling group. The sibling group to which a storage request is submitted depends on whether any sibling group already stores the chunk, and which sibling groups are considered "full".

Storage may be added to such a CAS system one sibling group at a time. When a sibling group is added, no hash segments need to be reassigned, and no chunks need to be relocated to the newly-added sibling group. The new sibling group is made available to store new chunks, and, along with the other sibling groups, receives and attempts to process all chunk retrieval requests made to the CAS system.

In one embodiment, each sibling group may correspond to a rack of a storage server, where the blades installed on the rack correspond to the storage units that are members of the sibling group. Each rack is assigned the entire hash space, and the hash space is divided into hash segments that are assigned to individual blades within the rack. In such an embodiment, increasing the storage of the CAS system may be accomplished simply by adding a new rack to the storage server.

The CAS Interface

Chunks are stored in and retrieved from a CAS system by submitting commands through an interface provided by the CAS system. According to one embodiment, the CAS interface supports the following calls:

get(access key)—requests retrieval of the chunk associated with the specified access key;

put(content)—requests storage, as a chunk, of the specified content;

touch(access key)—updates the metadata of the chunk associated with the specified access key, if such a chunk exists, to indicate that the chunk has been used or accessed, and returns a Boolean value that's the answer to the question "does the chunk store currently contain a chunk that corresponds to this access key?".

These are merely examples of the types of functions that may be invoked through the interface presented by the CAS system. The techniques described herein are not limited to any particular functions, nor the specific parameters thereof.

Example CAS System

Figure 1:
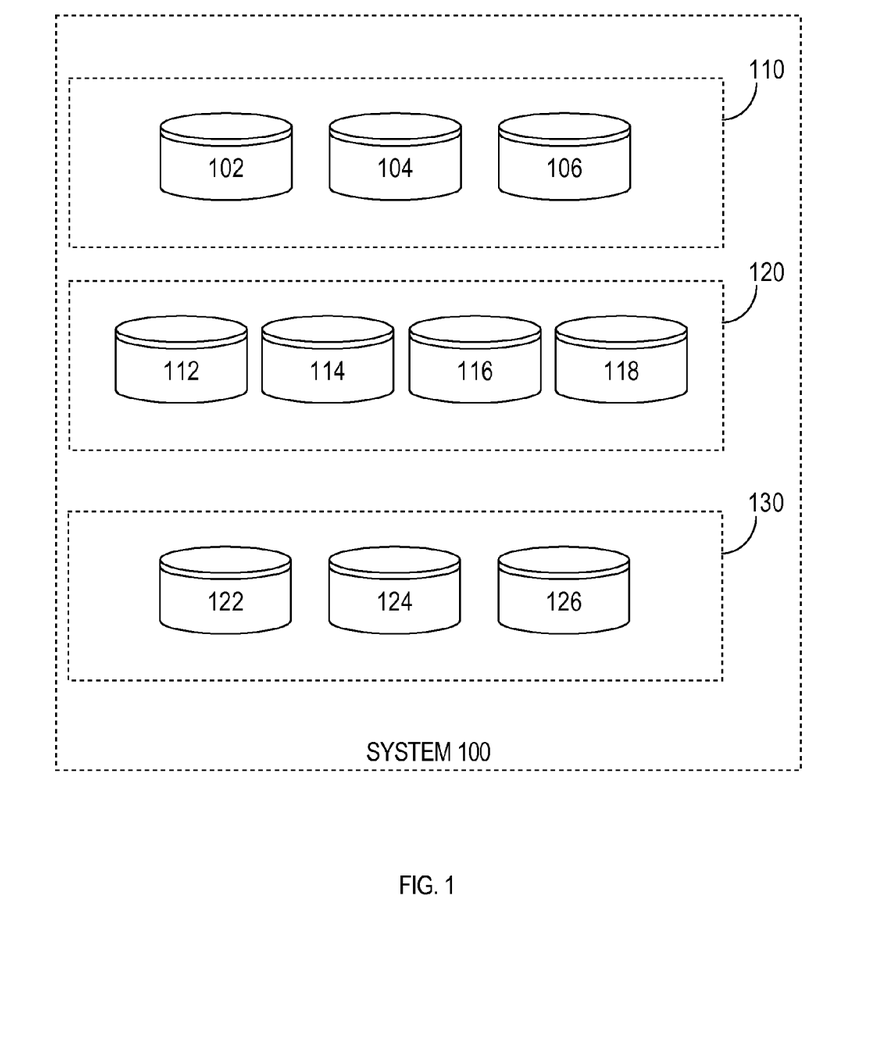
FIG. 1 is a block diagram of a storage system that includes a plurality of sibling groups, according to an embodiment of the invention.

FIG. 1 is a block diagram of a CAS system 100 configured to implement the data storage techniques described herein. Referring to FIG. 1, system 100 includes a plurality of sibling groups 110, 120 and 130. Each of the sibling groups includes a plurality of storage units. Specifically, sibling group 110 includes storage units 102, 104 and 106. Sibling group 120 includes storage units 112, 114, 116 and 118. Sibling group 130 includes storage units 122, 124 and 126.

While each sibling group in system 100 includes relatively few individual storage units, there is no limit to the actual number of storage units in a sibling group. When implemented in a system in which the sibling groups correspond to racks within a storage server, the number of storage units within each sibling group may be the number of blades within each rack. It should be noted that there need not be any relationship between the number of storage units in the various sibling groups. For example, sibling group 120 has a different number of storage units than sibling groups 110 and 130.

As mentioned above, each sibling group 110, 120 and 130 is assigned the entire hash space, and within each sibling group, the hash space is partitioned into hash segments, and the hash segments are assigned among the members of each sibling group. For the purpose of illustration, it shall be assume that the hash space is 0 to 1,000,000, and the hash space is partitioned within each sibling group as follows:

SIBLING GROUP 110: Storage unit 102 is assigned 0-333,333. Storage unit 104 is assigned 333,334-666,666. Storage unit 106 is assigned 666,667-1,000,000.

SIBLING GROUP 120: Storage unit 112 is assigned 0-250,000. Storage unit 114 is assigned 250,001-700,000. Storage unit 116 is assigned 700,001-800,000. Storage unit 118 is assigned 800,001-1,000,000.

SIBLING GROUP 130: Storage unit 122 is assigned 0-300,000. Storage unit 124 is assigned 300,001-600,000. Storage unit 126 is assigned 600,001-1,000,000.

Figure 2:
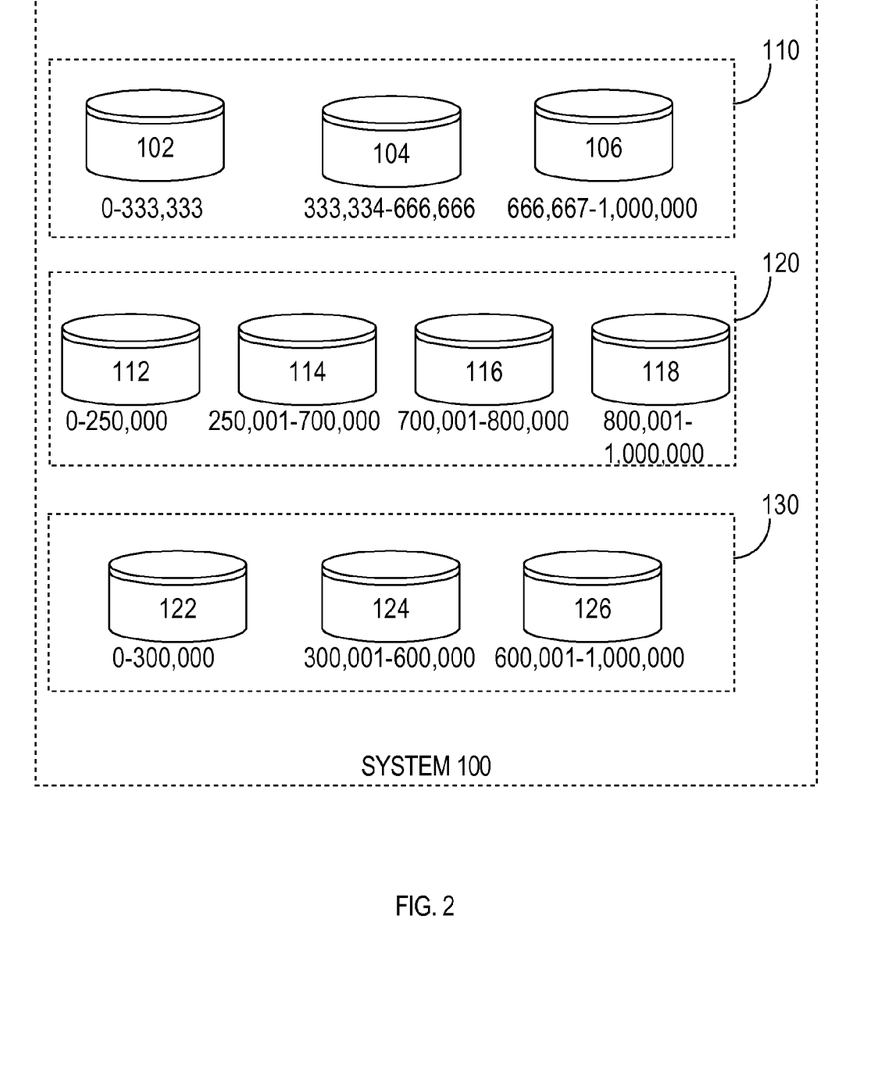
FIG. 2 is a block diagram of the storage system illustrated in FIG. 1, where hash segments have been assigned to individual storage units.

FIG. 2 is a block diagram of system 100 that depicts the hash-segment-to-storage-unit mapping specified in this example.

As shall be explained in detail hereafter, the sibling group membership and hash segment assignment affect how chunk-related requests are processed by system 100. By handling chunk-related requests in the manner described herein, additional storage may be added to system 100, one sibling group at a time, with minimal transition overhead, downtime, and movement of data.

Handling a Get Operation

A "get" operation is an operation to retrieve a chunk based on the access key of the chunk. According to one embodiment, system 100 handles a get request by submitting the get request to each of the sibling groups 110, 120 and 130. The get requests may be submitted in parallel to all sibling groups, or submitted serially.

For example, assume that system 100 receives an access key of 321,321. In an embodiment that submits requests in parallel, the get(321,321) request would be submitted to sibling groups 110, 120 and 130 in parallel. In parallel, each of the sibling groups would direct the request to the storage unit assigned to the hash segment into which the access key falls. In the present example, sibling group 110 directs the get(321, 321) request to storage unit 102, sibling group 120 directs the get(321,321) request to storage unit 114, and sibling group 130 directs the get(321,321) to storage unit 124.

As shall be described in greater detail below, when a chunk is stored in system 100, the chunk is stored in only one sibling group. Therefore, even though sibling groups 110, 120 and 130 are all asked to execute the get(321,321) request, the corresponding chunk is actually returned by only one of those sibling groups, if at all. For the purpose of illustration, it shall be assumed that the chunk associated with the index 321,321 is stored on storage unit 114 of sibling group 120. Under these circumstances, storage unit 114 would respond to the get (321,321) request by returning the corresponding chunk, which would then be returned by system 100 as a response to the get(321,321) request. If none of the sibling groups responded with the chunk, then system 100 would respond to the get(321,321) request with an indication that the requested chunk was not found.

In an embodiment that submits the chunk requests to the sibling groups serially, system 100 may send the get(321,321) request first to sibling group 110. When storage unit 102 is unable to find the chunk, system 100 then sends the get(321, 321) request to sibling group 120. When storage unit 114 returns the requested chunk, the requested chunk is returned by system 100 to the requestor without ever having to query sibling group 130 for the chunk. Sending the get requests serially may save some processing overhead when the requests are sent to the sibling groups in an order that is based on the likelihood that the sibling groups will have the requested chunk, where the sibling group deemed most likely to have the chunk is queried first. However, the serial processing of get requests decreases parallelism, and therefore will tend to increase the average latency incurred when responding to get requests.

Handling a Put Operation

A put operation causes a chunk to be stored by system 100. Because all of the sibling groups have been assigned the entire hash space, then any chunk, regardless of the access key to which it hashes, may be stored in any of the sibling groups. As mentioned above, techniques are provided to ensure that any given chunk is stored in only one of the sibling groups. According to one embodiment, storing the same chunk in multiple sibling groups is avoided by initially responding to a put request by checking to see whether the chunk is already stored somewhere in system 100.

For example, in one embodiment, system 100 initially responds to a put request by generating the hash value for the chunk, and performing a "touch" operation based on the hash value. The touch request is sent to all sibling groups, either in parallel or serially as described above with respect to get requests. If any sibling group responds affirmatively to the touch request, then the chunk specified in the put request is already stored in system 100. Therefore, no further action need be performed in response to the put request.

On the other hand, if no sibling group responds affirmatively to the touch request, then the chunk is not already stored in system 100. Therefore, a target sibling group is selected from among the sibling groups, and the put request is sent to the target sibling group. Techniques for selecting a target sibling group shall be described in greater detail below.

As an example of how a put request is handled, according to one embodiment, assume that system 100 receives a request to put(chunkX). In response to receiving the request, system 100 applies a hash function to chunkX to generate the access key for chunkX. For the purpose of illustration, it shall be assumed that the access key for chunkX is 699,888.

After having generated the access key, system 100 sends a touch(699,888) command to each of sibling groups 110, 120 and 130. For the purpose of illustration, it shall be assumed that system 100 sends the touch commands to the sibling groups 110, 120 and 130 in parallel.

In response to the touch commands, each of sibling groups determines whether the storage unit that is assigned the hash segment into which 699,888 falls is storing a chunk for that access key. In the present example, sibling group 110 checks storage unit 106, sibling group 120 checks storage unit 114, and sibling group 130 checks storage unit 126. Assuming that chunkX is not currently being stored by system 100, each of the sibling groups 110, 120 and 130 would respond to the touch command by indicating that chunkX was not found.

In response to negative responses from all of the sibling groups, system 100 selects a target sibling group, and sends the put(chunkX) request to the target sibling group. For the purpose of explanation, assume that sibling group 120 is the target sibling group. Under these circumstances, the put(chunkX) command is sent to sibling group 120, and chunkX is stored on storage unit 114.

Selecting a Target Sibling Group

As mentioned above, one of the sibling groups is selected as the target sibling group for a put command, and only that sibling group stores the chunk specified in the put command. Various techniques may be used for selecting which sibling group is selected for as the target sibling group, and the present invention is not limited to any particular technique.

In one embodiment, an order is assigned to the sibling groups, and the lowest-ordered sibling group that is not "full" is selected as the target. For example, assume that sibling groups 110, 120 and 130 are assigned the order 1, 2 and 3, respectively. Under these circumstances, sibling group 110 would be selected as the target for all put operations until sibling group 110 is full. Once sibling group 110 is full, sibling group 120 is selected for the target of all put operations, until sibling group 120 is full. Once sibling group 120 is full, then sibling group 130 is selected as the target sibling group for all put operations.

Various criteria can be used to determine whether a sibling group is "full". For example, in one embodiment, a sibling group may be considered "full" if 95% of its storage capacity has been used to store chunks. As another example, a sibling group may be considered "full" if 99% of the storage capacity of any one of its individual storage units has been used to store chunks. In yet another embodiment, a sibling group may be considered full only if it has insufficient space to store the chunk that is the subject of the current put request.

With respect to "full" sibling groups, the central limit theorem applies in that if one disk is full then the other disks in the sibling group are highly likely to be nearly full. For example, if a disk contains N chunks, the variation expected is of the order of (N**0.5) (i.e. power(N, ½)). So for a realistic value of a disk with 1 million chunks that is the first to reach 100% full, the other disks in the sibling group are most likely to be at 99.9% of that.

By selecting target sibling groups based on which group is the lowest-ordered not-full sibling group, a very high utilization rate may be achieved by adding sibling groups to a storage server on an as-needed basis. For example, a company may adopt a policy of always maintaining N+1 sibling groups, where N is the number of "full" sibling groups. Under such a policy, a storage server may initially have only one sibling group. As that sibling group becomes full, one new sibling group may be added. A third sibling group may be added when the second sibling group becomes full. Because all but one of the sibling groups in the system are full, a very high utilization rate can be maintained for large storage systems. For example, if a system has 20 sibling groups that are full (e.g. at 99% capacity) and one sibling group that is at 50% capacity, then the overall utilization of the system storage is approximately 97%.

Depending on the hash function used by the storage system, the storage units within the not-yet-full sibling group will tend to fill up evenly. Further, in environments where the rate at which new chunks are stored is relatively constant, the time at which the not-yet-full sibling group will become full may be predicted with relatively high accuracy. Based on those predictions and the knowledge of how long it takes to acquire and install a sibling group, an administrator may schedule to have new sibling groups installed and available for use just as the preceding sibling group becomes full.

Storage Unit Failure

When a storage unit fails, the chunks already stored on the storage unit may become unavailable. However, using the techniques described herein, the failure of a storage unit need not result in downtime, nor the movement of chunks between storage units. For example, assume that storage units 110 and 120 are full, and storage unit 130 is not full. Assume further that storage unit 102 fails. Under these conditions, sibling group 110 will simply return a "not found" response when get and touch requests are received for access keys in the range 0-333,333. This is true even if a chunk that is targeted by the operation had been stored on the failed storage unit 102. If the request was a touch request that was triggered by a put request, the negative response from sibling group 110 will merely cause the chunk identified in the put request to be stored by the target sibling group (e.g. group 130). Since sibling group 110 is already considered full, sibling group 110 will not be asked to store any new chunk that maps to the hash segment of the failed storage unit 102.

In the preceding example, the storage unit that failed was in a "full" sibling group. However, it is possible for a storage unit that is not in a full sibling group to fail. Such a failure may be handled in a variety of ways. For example, in one embodiment, the failure of a storage unit will automatically qualify a sibling group as full, without regard to how much unused storage remains in the sibling group. Because the sibling group is designated as full, the sibling group will not be selected as the target sibling group for subsequent put operations.

In an alternative embodiment, a not-yet-full sibling group that has a failed node may be treated as full only with respect to operations that fall within the hash segment of the failed node. For example, if storage unit 116 of sibling group 120 fails before sibling group 120 satisfies the fullness criteria, then sibling group 120 may be treated as full only relative to the hash segment 700,001-800,000. Thus, sibling group 120 may be still be selected as the target sibling group for put operations that fall outside that hash segment, but for put operations that fall within that segment, sibling group 130 would be selected as the target sibling group.

Hash Function Selection

Though rare, it is possible for a hash function to distribute chunks unevenly within a hash space. For example, given a particular set of chunks, a hash function HF1 may happen to assign a disproportionate number of the chunks to the hash segment assigned to a particular storage unit. As a result, the "overloaded" storage unit will fill faster than the other storage units in the same sibling group. As the overloaded storage unit becomes full, the sibling group to which that storage unit belongs may be considered full even though many of the storage units within the sibling group may have a significant amount of unused space. It is wasteful to treat the sibling group as "full" while many of its storage units have a significant amount of unused space.

Wasting storage within a sibling group because of hash function skew is bad, but wasting storage in all sibling groups because of hash function skew is worse. To avoid a situation in which all sibling groups in a storage system exhibit the same hashing skew, different sibling groups may employ different hash functions. For example, sibling groups 110, 120 and 130 may respectively use three different hash functions HF1, HF2 and HF3. Because the different sibling groups employ different hash functions, the likelihood that skewing experienced within one of the sibling groups will be repeated within the other sibling groups is significantly reduced.

It should be noted that the hash function used to distribute the chunks over the disks is typically not the same hash function that is used to compute the access key for a chunk. Rather, the hash function used to distribute the chunks over the disks is typically a function that takes the access key and produces a small integer corresponding to the disk number in the array (i.e. in the sibling group). If there is a sibling group with 42 disks, for example, a function may be to take 64 bits (any 64 bits, e.g. bit 10 to 73) from the access key, and to compute these 64 bits modulo 42, which gives the disk number on which the chunk is to be stored.

In addition to different sibling groups using different hash functions, the "fullness" test may be applied on a per-storage-unit basis, rather than a per-sibling-group basis. For example, assume that storage unit 102 in sibling group 110 fills up quickly because HF1 overloads storage unit 102. Under these circumstances, storage unit 102 may be considered full at time T1, when the other storage units 104 and 106 within sibling group 110 still have a significant amount of free space.

In a system that applies the fullness test on a per-storage-unit basis, storage units 104 and 106 will continue to fill up after time T1, because sibling group 110 will be treated as full only with respect to put requests for chunks whose access keys fall into the range (0-333,333) assigned to the full storage unit 102. For put requests that fall outside of that range, sibling group 110 would not be considered full. Thus, sibling group 110 will be selected as the target sibling group for put operations outside that range, and storage units 104 and 106 will continue to be filled with new chunks until full.

Read-Only Mode

As mentioned above, when a storage unit satisfies the fullness criteria (either because the storage unit itself is full, or the sibling group to which the storage unit belongs is considered to be full), the storage unit will cease to be the target of put operations. Because the storage unit will not be the target of put operations, the operations that will involve the storage unit may be performed while the storage unit is in a read-only mode. Depending on the storage unit, placing the unit in read-only mode may reduce the amount of energy consumed by the storage unit.

Therefore, according to one embodiment, in response to determining that a storage unit is full, the following operations are performed:

target metadata is stored to indicate that the sibling group should no longer be selected as the target for put operations for chunks that fall in the hash segment assigned to the storage unit, and the storage unit is transitioned from read/write mode to read-only mode For example, assume that, at time T1, none of storage units 102, 104 and 106 are full. At time T1, the target metadata would indicate that sibling group 110 is the target sibling group for put operations for the entire hash space. Assume that at time T2, storage unit 102 becomes full (i.e. satisfies the fullness criteria). Consequently, at time T2, the target metadata is updated to indicate that sibling group 120 is the target group for the hash segment (0-333,333) associated with storage unit 102, while sibling group 110 remains the target sibling group for the hash segment (333,334-1,000,000). In addition, storage unit 102 is transitioned from read/write to read-only mode.

Later, at time T3, storage unit 104 may become full. In response to storage unit 104 becoming full, the target metadata is updated to indicate that sibling group 110 remains the target sibling group for the range (666,667-1,000,000), while sibling group 120 is now the target sibling group for the range 0-666,666. In addition, storage unit 104 is transitioned from read/write to read-only mode.

At time T4, when storage unit 106 becomes full, the target metadata is updated to indicate that sibling group 120 is the target group for the entire hash space, and storage unit 106 is transitioned from read/write to read-only mode.

In embodiments where the fullness test is applied on a per-sibling group basis, the storage system the target metadata may simply indicate the current target sibling group for all put requests, and all storage units within a sibling group may be transitioned to read-only at the same time. For example, in response to sibling group 110 satisfying the fullness criteria, the target metadata is updated to indicate that sibling group 120 is to be the target for all put requests. In addition, all storage units 102, 104 and 106 within sibling group 110 may be transitioned from read/write to read-only.

Rack-Based Implementation

Sibling groups may be made up of any number, size, and type of storage units. The storage units within a sibling group need not have anything in common other than the fact that they manage chunks that fall into different segments of the same hash space. However, one common structure for implementing a storage server is a storage "cabinet" that has interfaces through which users can install "racks", each of which hosts several (e.g. 50) blades.

In an environment in which a cabinet is used to implement the techniques described herein, each sibling group may correspond to a rack within the cabinet, where the blades on a rack are the storage units that belong to the sibling group that corresponds to the rack. In such an implementation, within each rack, the entire hash space is partitioned into hash segments that are assigned to the blades within the rack. Get requests that are issued to the cabinet are sent to each rack. Within each rack, it is determined whether the blade that is assigned the hash segment into which the requested chunk falls actually stores the requested chunk. If any rack has the requested chunk, the rack returns the requested chunk, and the cabinet returns the requested chunk to the requestor.

In the cabinet environment, put requests are handled by sending touch requests to all of the racks. Each rack responds by indicating whether it has the chunk that is targeted by the touch request. If no rack has the chunk, then the cabinet determines which rack is currently the target rack for the put request. The put request is then sent only to the target rack thus selected.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

The special-purpose computing devices may be desktop computer systems, portable computer systems, handheld devices, networking devices or any other device that incorporates hard-wired and/or program logic to implement the techniques. Any portable device with computing ability may be used to implement the techniques described herein, including but not limited to mobile devices such as tablets, cell phones, PDAs, etc.

Figure 3:
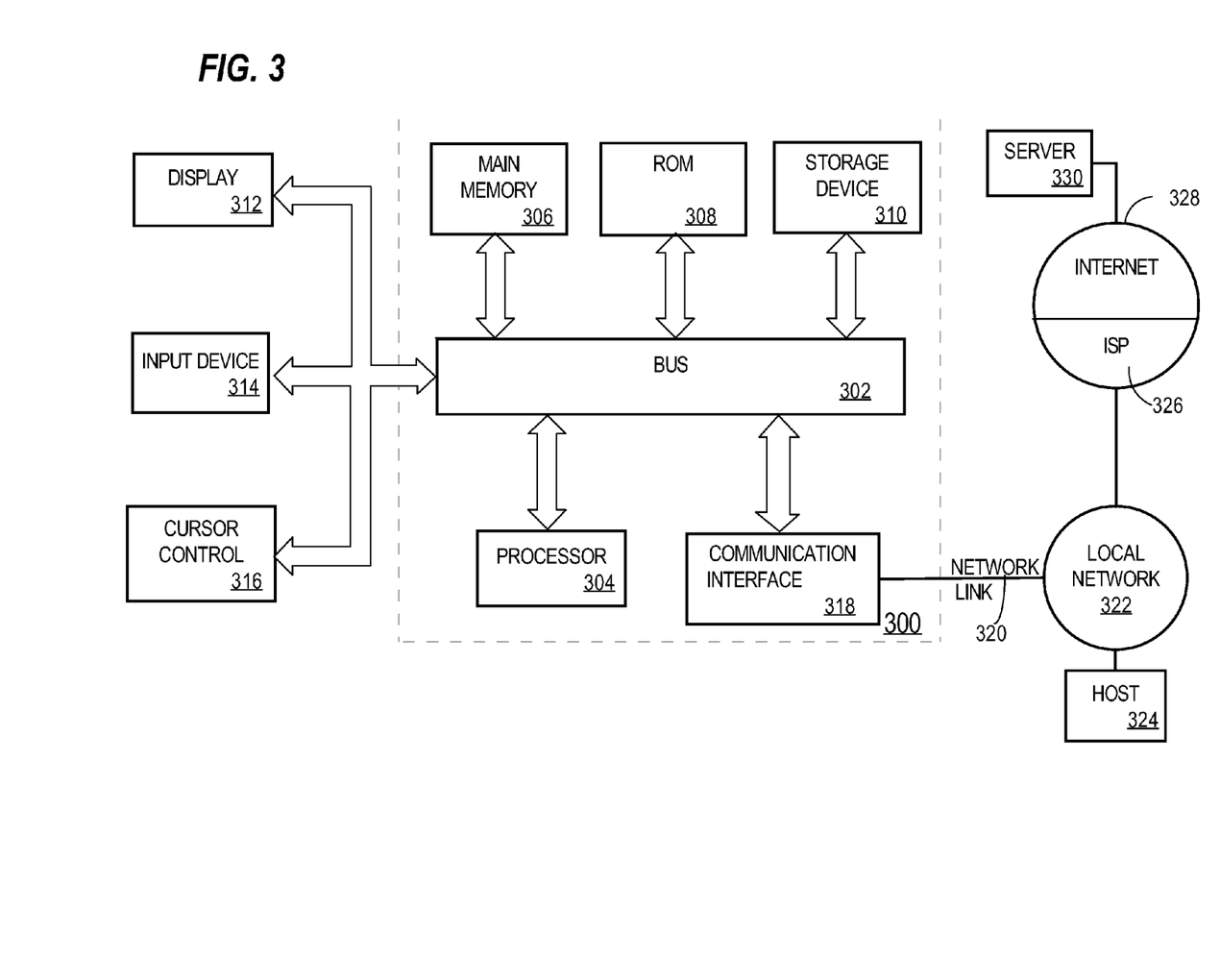
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage unit, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage unit coupled to bus 302 for storing static information and instructions for processor 304. A storage unit 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage unit 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage unit 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage unit 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage unit 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving a request to store a chunk in a content-addressable system that includes a plurality of sibling groups;
  in response to receiving the request to store the chunk, performing the steps of
    generating an access key for the chunk by applying a function to content of the chunk; and
    sending a plurality of first requests to determine whether the chunk is already stored in the content-addressable system;
  wherein sending the plurality of first requests includes sending a first request identifying the chunk using the access key generated for the chunk to each of the plurality of sibling groups;
  based on responses to the plurality of first requests, determining that no chunk that corresponds to the access key is stored in the content-addressable system;
  in response to determining that no chunk that corresponds to the access key is stored in the content-addressable system, performing the steps of
    selecting, from among the plurality of sibling groups, a particular sibling group to be the target group for the request to store the chunk; and
    sending a second request to store that chunk only to the particular sibling group, to cause the particular sibling group to store the chunk;

wherein the method is performed by one or more computing devices.

2. The method of claim 1 wherein:

the function is a hash function;

the access key is a value that falls within a hash space corresponding to the hash function;

the entire hash space is assigned to each of the plurality of sibling groups;

within each sibling group, hash segments of the hash space are assigned to storage units that belong to the sibling group; and within each sibling group, the storage unit that is assigned a particular hash segment is responsible for storing chunks that are associated with access keys that fall within the particular hash segment.

3. The method of claim 1 further comprising:

receiving a request to retrieve the chunk from the content-addressable system, wherein the request to retrieve the chunk specifies the access key for the chunk;

in response to receiving the request to retrieve the chunk, performing the steps of sending a plurality of third requests to retrieve the chunk, wherein sending the plurality of third requests includes sending a third request to each of the plurality of sibling groups;

receiving the chunk from the particular sibling group in response to the third request sent to the particular sibling group; and providing the chunk as a response to the request to retrieve the chunk.

4. The method of claim 1 wherein selecting the particular sibling group to be the target sibling group for the request to store the chunk comprises:

establishing an order to the plurality of sibling groups; and selecting, as the target sibling group, the first sibling group, in the order, that does not satisfy fullness criteria.

5. The method of claim 2 wherein:

selecting the particular sibling group to be the target sibling group for the request to store the chunk comprises:

establishing an order to the plurality of sibling groups; and selecting, as the target sibling group, the first sibling group, in the order, that does not satisfy fullness criteria; and the method further comprises determining whether the fullness criteria is satisfied by a given sibling group based on whether the particular storage unit, within the given sibling group, that is assigned the hash segment into which the access key falls, satisfies the fullness criteria.

6. The method of claim 1 wherein:

the plurality of sibling groups includes:

a first sibling group that uses a first hash function to determine access keys of chunks; and a second sibling group that uses a second hash function to determine access keys of chunks; and the first hash function is different than the second hash function.

7. The method of claim 2 further comprising, in response to determining that a particular storage unit within one of the plurality of sibling groups is full, transitioning the particular storage unit from read/write mode to read-only mode.

8. The method of claim 2 further comprising, in response to determining that a particular storage unit is full, updating target metadata to indicate that, for at least chunks that have access keys that fall within the hash segment assigned to the particular storage unit, the sibling group to which the particular storage unit belongs is not to be the target of subsequent requests to store chunks.

9. The method of claim 1 wherein:

The content-addressable system comprises a cabinet with a plurality of racks; and each sibling group of the plurality of sibling groups is a rack of blades installed in the cabinet.

10. The method of claim 1 further comprising expanding storage of the content-addressable system by adding a new sibling group to the plurality of sibling groups without moving any chunks from any of the plurality of sibling groups to the new sibling group, wherein after the new sibling group is added to the plurality of sibling groups, the content-addressable system sends requests for chunks to the new sibling group in addition to the other sibling groups of the plurality of sibling groups.

11. One of more non-transitory computer-readable media storing instructions for performing a method that comprises the steps of:

receiving a request to store a chunk in a content-addressable system that includes a plurality of sibling groups;

in response to receiving the request to store the chunk, performing the steps of generating an access key for the chunk by applying a function to content of the chunk; and sending a plurality of first requests to determine whether the chunk is already stored in the content-addressable system;

wherein sending the plurality of first requests includes sending a first request identifying the chunk using the access key generated for the chunk to each of the plurality of sibling groups;

based on responses to the plurality of first requests, determining that no chunk that corresponds to the access key is stored in the content-addressable system;

in response to determining that chunk that corresponds to the access key is stored in the content-addressable system, performing the steps of selecting, from among the plurality of sibling groups, a particular sibling group to be the target group for the request to store the chunk; and sending a second request to store that chunk only to the particular sibling group, to cause the particular sibling group to store the chunk;

wherein the method is performed by one or more computing devices.

12. The one of more non-transitory computer-readable media of claim 11 wherein:

the function is a hash function;

the access key is a value that falls within a hash space corresponding to the hash function;

the entire hash space is assigned to each of the plurality of sibling groups;

within each sibling group, hash segments of the hash space are assigned to storage units that belong to the sibling group; and within each sibling group, the storage unit that is assigned a particular hash segment is responsible for storing chunks that are associated with access keys that fall within the particular hash segment.

13. The one of more non-transitory computer-readable media of claim 11, wherein the method further comprises:

receiving a request to retrieve the chunk from the content-addressable system, wherein the request to retrieve the chunk specifies the access key for the chunk;

in response to receiving the request to retrieve the chunk, performing the steps of
sending a plurality of third requests to retrieve the chunk, wherein sending the plurality of third requests includes sending a third request to each of the plurality of sibling groups;
receiving the chunk from the particular sibling group in response to the third request sent to the particular sibling group; and
providing the chunk as a response to the request to retrieve the chunk.

14. The one of more non-transitory computer-readable media of claim 11 wherein selecting the particular sibling group to be the target sibling group for the request to store the chunk comprises:
establishing an order to the plurality of sibling groups; and
selecting, as the target sibling group, the first sibling group, in the order, that does not satisfy fullness criteria.

15. The one of more non-transitory computer-readable media of claim 12 wherein:
selecting the particular sibling group to be the target sibling group for the request to store the chunk comprises:
establishing an order to the plurality of sibling groups; and
selecting, as the target sibling group, the first sibling group, in the order, that does not satisfy fullness criteria; and
the method further comprises determining whether the fullness criteria is satisfied by a given sibling group based on whether the particular storage unit, within the given sibling group, that is assigned the hash segment into which the access key falls, satisfies the fullness criteria.

16. The one of more non-transitory computer-readable media of claim 11 wherein:
the plurality of sibling groups includes:
a first sibling group that uses a first hash function to determine access keys of chunks; and
a second sibling group that uses a second hash function to determine access keys of chunks; and
the first hash function is different than the second hash function.

17. The one of more non-transitory computer-readable media of claim 12, wherein the method further comprises, in response to determining that a particular storage unit within one of the plurality of sibling groups is full, transitioning the particular storage unit from read/write mode to read-only mode.

18. The one of more non-transitory computer-readable media of claim 12, wherein the method further comprises, in response to determining that a particular storage unit is full, updating target metadata to indicate that, for at least chunks that have access keys that fall within the hash segment assigned to the particular storage unit, the sibling group to which the particular storage unit belongs is not to be the target of subsequent requests to store chunks.

19. The one of more non-transitory computer-readable media of claim 11 wherein:
the content-addressable system comprises a cabinet with a plurality of racks; and
each sibling group of the plurality of sibling groups is a rack of blades installed in the cabinet.

20. The one of more non-transitory computer-readable media of claim 11, wherein the method further comprises expanding storage of the content-addressable system by adding a new sibling group to the plurality of sibling groups without moving any chunks from any of the plurality of sibling groups to the new sibling group, wherein after the new sibling group is added to the plurality of sibling groups, the content-addressable system sends requests for chunks to the new sibling group in addition to the other sibling groups of the plurality of sibling groups.

21. A content addressable storage (CAS) system comprising:
a plurality of storage units;
wherein each storage unit is assigned to one of a plurality of sibling groups;
wherein each sibling group is assigned an entire hash space;
wherein, within each sibling group, the entire hash space is partitioned into hash segments which are assigned to the individual storage units that belong to the sibling group;
wherein a particular sibling group is configured to store a particular chunk in a particular storage unit that is assigned the hash segment that contains an access key generated by applying a hash function to content of the particular chunk.

22. The content addressable storage system of claim 21 wherein the content addressable storage system is configured to:
submit chunk retrieval requests to all sibling groups; and
submit chunk storage requests to a single sibling group;
wherein the sibling group to which a storage request is submitted depends on whether any sibling group already stores the chunk, and which sibling groups are considered full.

* * * * *